United States Patent
Shearing (10) Patent No.: US 8,221,687 B2
(45) Date of Patent: Jul. 17, 2012

(54) SYSTEM AND METHOD FOR THE REMOVAL OF GREENHOUSE GASES

(76) Inventor: Ernest John Shearing, Porterville, CA (US)

( * ) Notice: Subject to any disclaimer, the term of this patent is extended or adjusted under 35 U.S.C. 154(b) by 70 days.

(21) Appl. No.: 12/916,457

(22) Filed: Oct. 29, 2010

(65) Prior Publication Data

US 2012/0107206 A1     May 3, 2012

(51) Int. Cl.
   *A61L 9/00*     (2006.01)
   *A61L 9/16*     (2006.01)

(52) U.S. Cl. .......... 422/120; 423/210; 423/245.3; 423/246; 423/235; 423/242.1; 423/220; 423/430; 518/700; 518/702

(58) Field of Classification Search .......... 422/120; 423/210, 245.3, 246, 235, 242.1, 220, 430; 518/700, 702 A
See application file for complete search history.

(56) References Cited

U.S. PATENT DOCUMENTS

| | | | |
|---|---|---|---|
| 2003/0039577 A1* | 2/2003 | Nelson et al. | 422/4 |
| 2003/0072688 A1* | 4/2003 | Matias | 422/120 |
| 2008/0237035 A1* | 10/2008 | Kurusu et al. | 204/242 |
| 2010/0028217 A1* | 2/2010 | Hach | 422/120 |
| 2012/0003722 A1* | 1/2012 | Polak et al. | 435/257.1 |

OTHER PUBLICATIONS

Washing Carbon Out of the Air, Klaus S. Lackner, Scientific American, Jun. 2010 pp. 66-71.

* cited by examiner

*Primary Examiner* — Timothy Vanoy
(74) *Attorney, Agent, or Firm* — Fulwider Patton LLP (57) ABSTRACT

A system and a method are provided for removing greenhouse gases, particulates and pollutants from the atmosphere utilizing a greenhouse gas collection apparatus. An atmospheric mixture is collected and progressively treated in first, second and third tube furnaces and a scrubber to produce an effluent for treatment in a chemical processing plant. The first tube furnace oxidizes hydrocarbons, the second tube furnace oxidizes any remaining nitrous and nitric oxides, and the third tube furnace oxidizes sulfur dioxide. The scrubber precipitates carbon dioxide as calcium carbonate. A vacuum pump draws the atmospheric mixture through tube furnaces and the scrubber.

18 Claims, 6 Drawing Sheets

$$CO_2\,(g) + 4\,H_2\,(g) \longrightarrow CH_4\,(g) + 2H_2O\,(g)$$

FIG. 5

$$CH_4\,(g) \xrightarrow{\Delta} C\,(s) + 2H_2\,(g)$$

FIG. 6

$$CO_2\,(g) + 3\,H_2\,(g) \xrightarrow[100\text{atm}]{375°} CH_3OH\,(g) + H_2O\,(g)$$

FIG. 7

$$2CH_3OH\,(g) \xrightarrow[Cu]{300°} 2H_2CO\,(g) + 2H_2\,(g)$$

FIG. 8

$$3CO_2(g) + 4NH_3(l) \xrightarrow{\Delta} 3\,H_2NCOONH_4(l) \longleftrightarrow 3(NH_2)_2CO(aq) + 3H_2O(l)$$

FIG. 9

$$6H_2CO\,(aq) + 4NH_3\,(aq) \longrightarrow (CH_2)_6N_4(s) + 6H_2O\,(aq)$$

SYSTEM AND METHOD FOR THE REMOVAL OF GREENHOUSE GASES

BACKGROUND OF THE INVENTION

The present invention relates generally to removal of greenhouse gases, particulates and pollutants from the atmosphere, and more particularly relates to system and method for the removal of greenhouse gases, particulates and pollutants from the atmosphere utilizing a greenhouse gas collection apparatus for collecting greenhouse gases, particulates and pollutants from the atmosphere, and first and second tube furnaces and a chemical processing plant for receiving and processing the greenhouse gases, particulates and pollutants collected by the greenhouse gas collection apparatus.

Numerous greenhouse gases, particulates and pollutants including carbon monoxide, carbon dioxide, hydrocarbons, nitrous and nitric oxides, sulfur dioxides and trioxides, and a variety of particulate components of air pollution are commonly introduced into the atmosphere from the smokestacks of a multitude of industrial and manufacturing processes, as well as by automotive engines and catalytic converters. It would be desirable to provide a system and method for removing carbon monoxide, carbon dioxide, hydrocarbons, nitrous and nitric oxides, and sulfur dioxides and trioxides, as well as particulate components of air pollution from the atmosphere, in order to reduce the amount of such greenhouse gases and pollutants in the atmosphere, to help mitigate the current trend toward global warming and the greenhouse effect. The present invention meets these and other needs.

SUMMARY OF THE INVENTION

Briefly, and in general terms, the present invention provides for system and method for removing greenhouse gases, particulates and pollutants from the atmosphere, in which an atmospheric mixture is collected containing air pollutants that can include greenhouse gases, particulates, pollutants, and progressively treating the collected atmospheric mixture by passing the collected atmospheric mixture through first, second and third tube furnaces and a scrubber to produce an effluent that can be further treated in a chemical processing plant, to remove constituents of the atmospheric mixture such as carbon monoxide, carbon dioxide, hydrocarbons, nitrous and nitric oxides, and sulfur dioxides and trioxides, particulates and other pollutants from the atmosphere.

Accordingly, the present invention provides for a system and method for removing greenhouse gases, particulates and pollutants from the atmosphere, utilizing a greenhouse gas collection apparatus including a collector assembly for collecting an atmospheric mixture from the atmosphere that typically contains air pollutants which can include greenhouse gases, particulates, and other pollutants. In a presently preferred aspect, the collector assembly includes an air intake head positioned for collecting the atmospheric mixture, and the air intake head includes an interior chamber and a central outlet nozzle connected in sealed fluid communication with the interior chamber of the air intake head. In another presently preferred aspect, the air intake head comprises a foil screen having apertures configured to filter the atmospheric mixture to permit passage of the atmospheric mixture into the interior chamber of the air intake head and to block the entrance of large objects into the interior chamber of the air intake head. In another presently preferred aspect, the air intake head can be suspended at a desired elevation in the atmosphere, such as by one or more skyhook balloon attached to one or more hooks on an outer surface of the air intake head. One or more tether lines may also be provided, each having a first end connected to one or more hooks on the surface of the air intake head and a second end connected to an anchor.

A first tube furnace receives the atmospheric mixture collected by the greenhouse gas collection apparatus, and oxidizes hydrocarbons in the atmospheric mixture into carbon dioxide and water to yield a first tube furnace effluent containing any unreacted portion of the atmospheric mixture and any carbon dioxide and water produced from the first tube furnace. In a presently preferred aspect, the first tube furnace contains a bed of cupric oxide. In another presently preferred aspect, the first tube furnace can be connected to the greenhouse gas collection apparatus by an elastomeric hose, which can be formed of a material having a low gas permeability. The elastomeric hose can be wrapped around a take-up reel having an intake spout and a hollow inner chamber, with the hollow inner chamber of the take-up reel being connected in sealed fluid communication with the first tube furnace.

A second tube furnace receives the first tube furnace effluent, and oxidizes nitrous and nitric oxides from the atmospheric mixture to nitrogen dioxide to yield a second tube furnace effluent containing any unreacted portion of the atmospheric mixture, any of the carbon dioxide to yield a second tube furnace effluent containing any unreacted portion of the atmospheric mixture, any carbon dioxide and water produced from the first tube furnace, and nitrogen dioxide from the second tube furnace. In a presently preferred aspect, the second tube furnace has a bed of chromium trioxide. A third tube furnace containing an iron oxide catalyst receives the second tube furnace effluent, and oxidizes sulfur dioxide in the atmospheric mixture to sulfur trioxide to yield a third tube furnace effluent containing any unreacted portion of the atmospheric mixture, any of the carbon dioxide, any of the nitrogen dioxide, and any of the sulfur trioxide from the third tube furnace.

A scrubber receives the third tube furnace effluent, and precipitates out the carbon dioxide from the second tube furnace effluent as calcium carbonate, to yield a scrubber effluent containing calcium carbonate, any unreacted portion of the atmospheric mixture, any of the nitrogen dioxide, and any of the sulfur trioxide from the second tube furnace effluent. In a presently preferred aspect, the scrubber contains a solution of calcium hydroxide in water, and the scrubber effluent contains a mixture of calcium hydroxide and precipitated calcium carbonate in water, along with particulates and pollutants collected in the atmospheric mixture. In another presently preferred aspect, the scrubber is configured to be removable and replaceable.

A vacuum pump is preferably connected to the scrubber to draw the atmospheric mixture collected from the atmosphere into the greenhouse gas collection apparatus and through the first tube furnace, to draw the first tube furnace effluent through the second tube furnace, to draw the second tube furnace effluent through the third tube furnace, to draw the third tube furnace effluent through the scrubber, and to draw any remaining particulates from the scrubber effluent through the vacuum pump. In a presently preferred aspect, the vacuum pump comprises vacuum turbine pump. In another presently preferred aspect, the vacuum pump can include a trap for particulates, such as a filter configured to collect particulates, or an electrostatic precipitator configured to collect particulates, for example.

A chemical processing plant can also be provided to process the mixture from the scrubber, and can include a filtering tower configured to dry the mixture of calcium hydroxide, calcium carbonate and water to yield a precipitate of calcium hydroxide and calcium carbonate, an acidification reaction vessel to acidify a portion of the precipitate of calcium hydroxide and calcium carbonate to yield carbon dioxide and a residual filtrate.

A high pressure reaction vessel can be provided to heat the mixture of calcium hydroxide, calcium carbonate and water to yield a gaseous mixture of water vapor and carbon dioxide, and a precipitate of calcium hydroxide. A reaction vessel can be provided to mix sodium sulfate with the precipitate of calcium hydroxide and calcium carbonate from the filtering tower and the residual filtrate from the acidification reaction vessel to yield calcium sulfate dihydrate. The high pressure reaction vessel can include a nickel catalyst, and can be used to react hydrogen gas with the carbon dioxide in the high pressure reaction vessel to yield methane and water. Alternatively, the high pressure reaction vessel can include a $ZnCrO_4$ catalyst, and can be used to react hydrogen gas with the carbon dioxide in the high pressure reaction vessel to yield methanol.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1A:
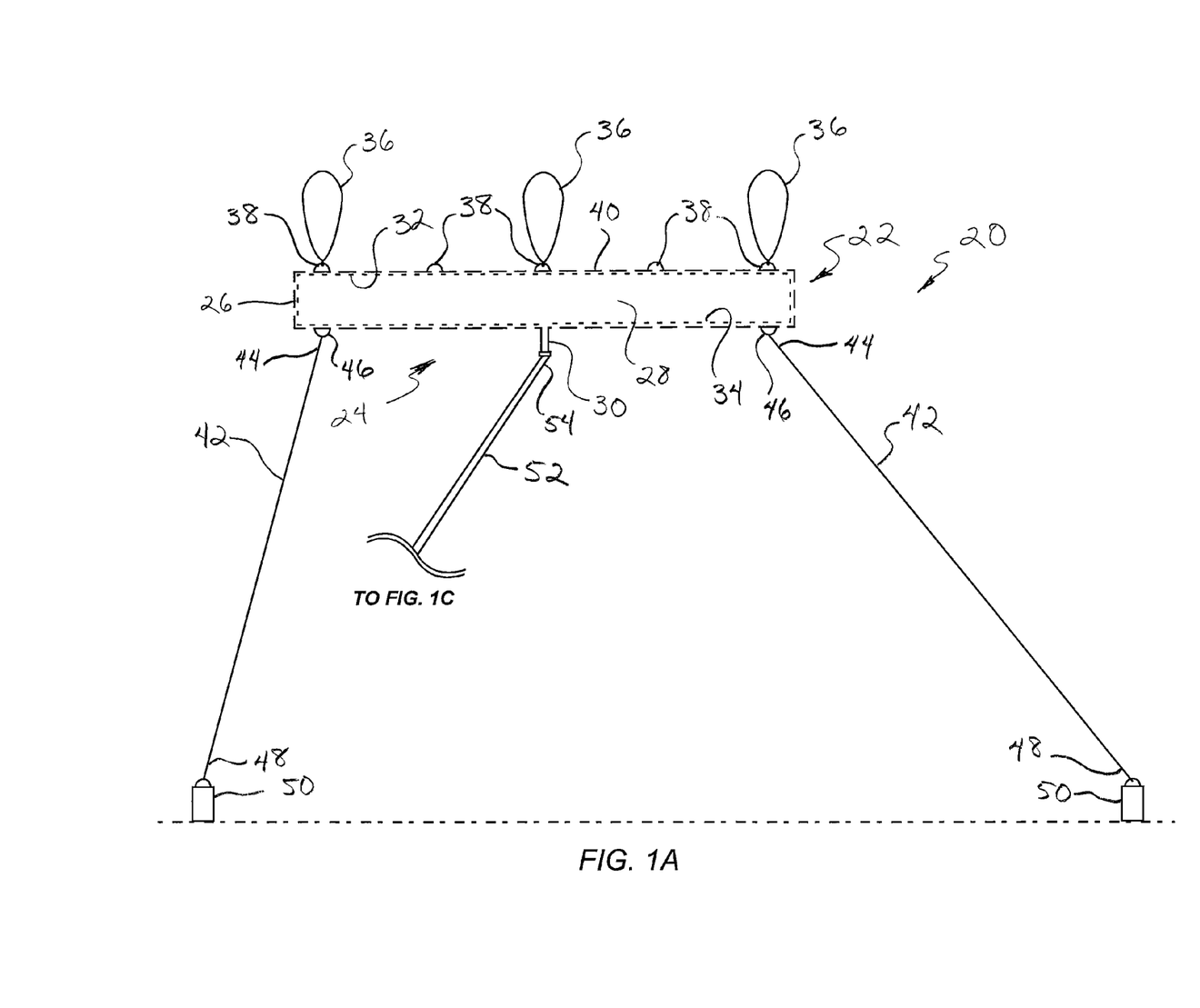
FIGS. 1A, 1B and 1C are a schematic diagram illustrating the system and method for removing greenhouse gases, particulates and pollutants from the atmosphere, and showing a greenhouse gas collection apparatus according to the present invention.
Figure 1B:
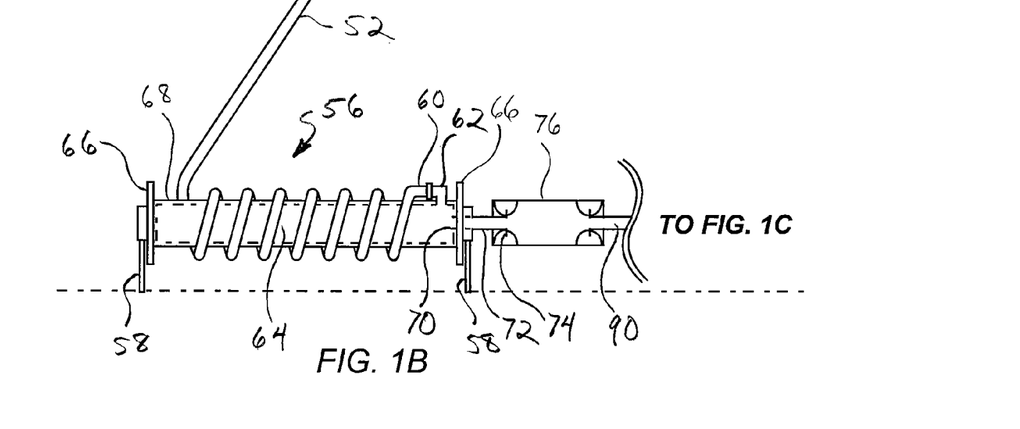
Figure 1C:
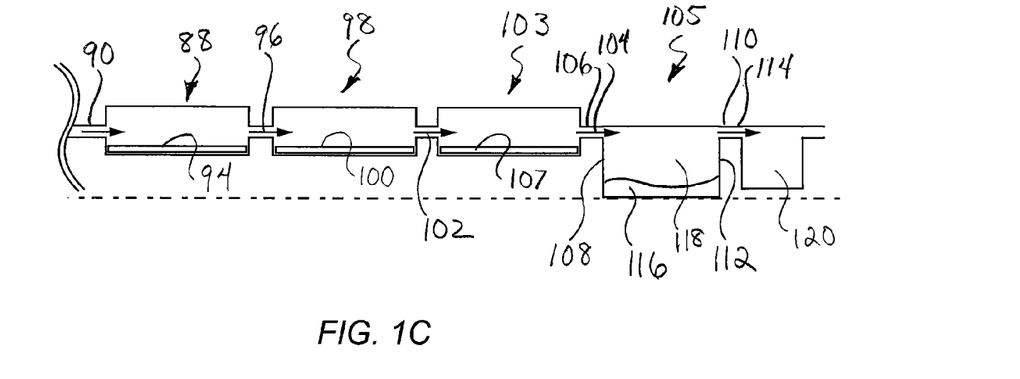
Figure 2:
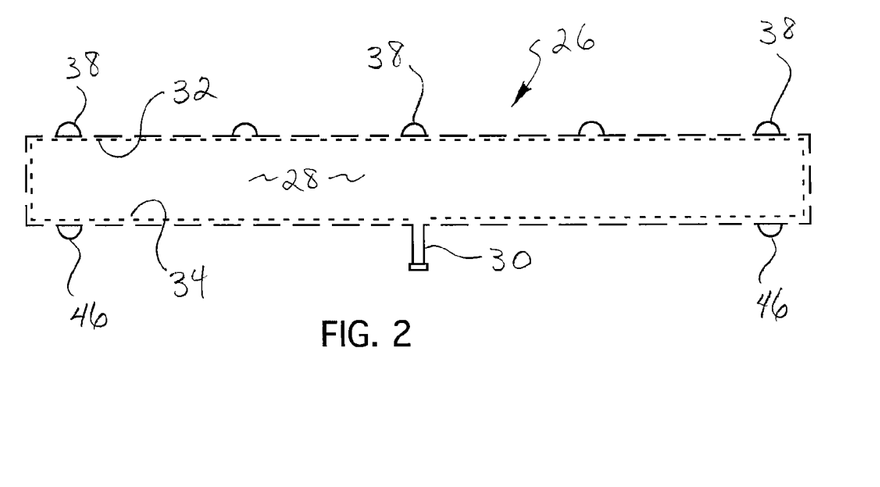
FIG. 2 is a schematic diagram of an air intake head of a collector assembly of a greenhouse gas collection apparatus of the system of FIGS. 1A, 1B and 1C.

Referring to the drawings, which illustrate the invention by way of example and not by way of limitation, the present invention provides for a system and method for removing greenhouse gases, particulates and pollutants from the atmosphere. Referring to FIGS. 1A, 1B and 1C, the system 20 includes a greenhouse gas collection apparatus 22 including a collector assembly 24 for collecting an atmospheric mixture from the atmosphere. Typical air pollutants to be collected by the greenhouse gas collection apparatus include greenhouse gases, particulates, and other pollutants such as hydrocarbons, for example. The collector assembly includes an air intake head 26 that is suitably positioned for collecting the atmospheric mixture to be treated. The air intake head typically includes an interior chamber 28 and a central outlet nozzle 30 connected in sealed fluid communication with the interior chamber of the air intake head. The air intake head preferably includes a filter 32 forming one or more sides air intake head enclosing the interior chamber. The filter can be formed by a foil screen, such as a titanium foil screen, for example, having apertures 34 configured to filter the atmospheric mixture, to permit passage of the atmospheric mixture into the interior chamber of the air intake head and to block the entrance of large objects into the interior chamber of the air intake head. The body of the air intake head can be formed of a duralumin or duraluminum alloy such as alloy (17S-T), with a thickness of approximately a millimeter or less, for example. The air intake head can have a length of as much as 1000 meters, a height of ten meters, and a width of a meter, for example. The air intake head can be suspended at a desired elevation in the atmosphere, such as by one or more skyhook balloons 36 attached to one or more hooks 38 on the outer surface 40 of the air intake head. The one or more skyhook balloons can be filled with hydrogen or helium, for example, and can be attached at various points along the length of the air intake head. One or more tether lines 42 may also be provided, each having a first end 44 connected to one or more hooks 46 on the outer surface of the air intake head, and a second end 48 connected to an anchor 50, which can be secured to the ground or a structure on the ground, or a suitably heavy object, for example. Alternatively, the air intake head can be connected to receive at least a portion of an exhaust or effluent gas from one or more smokestacks of an industrial plant or electrical generating plant, for example.

An air intake hose or conduit 52 is preferably connected at a first end 54 in sealed fluid communication to the central outlet nozzle of the air intake head. The air intake hose or conduit is preferably an elastomeric hose which can be formed of a material having a low gas permeability, such as a rubber or plastic, such as Tygon® tubing or neoprene, or even polyethylene tubing, if the airspace over which the device is to be used has a low amount of corrosive pollutants such as ozone, nitrous and nitric oxides, and sulfur trioxides in the air, for example. The air intake hose can be wrapped around a take-up reel 56 supported by legs 58, and the air intake hose is connected in sealed fluid communication at a second end 60 of the air intake hose with an intake spout 62 of the take-up reel, which can be conical and can be made of metal or plastic, for example, and which is connected in sealed fluid communication with a hollow inner chamber 64 of the take-up reel. The take-up reel currently preferably includes two circular disks 66 on the ends of a rotatable drum 68, and can be made of metal or plastic. The take-up reel is typically movable, and pays out varying lengths of hose to adjust to the height of the air intake head of the collector assembly of the greenhouse gas collection apparatus. The take-up reel also includes an outlet port 70 typically extending as a rotatable hollow tube 72 from the inner chamber of the take-up reel.

Figure 3:
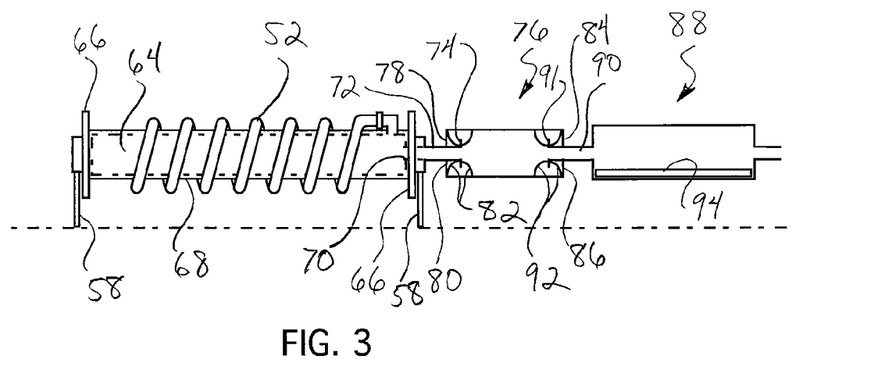
FIG. 3 is a schematic diagram of a take-up reel for an elastomeric hose of greenhouse gas collection apparatus of FIGS. 1A, 1B and 1C.

As can best be seen in FIG. 3, the rotatable hollow tube preferably terminates with a circular radially outer flange 74 on the end of the rotatable hollow tube. A stationary tube 76 is preferably connected in sealed fluid communication with the outlet port of the take-up reel, and can be made of metal or plastic, for example. The stationary tube typically includes a circular radially outer flange 78 at a first end 80 of the stationary tube overlapping the circular radially outer flange on the end of the rotatable hollow tube. A seal, such as one or more rubber or canvas flaps 82, is typically interposed between the circular radially outer flange on the end of the rotatable hollow tube and the circular radially outer flange at the first end of the stationary tube, and can be riveted or glued into place on the body of the stationary tube, for example, to act as a gas seal to help maintain a vacuum within the greenhouse gas collection apparatus for collecting the atmospheric mixture to be treated.

The stationary tube typically includes a circular radially outer flange 84 at a second end 86 of the stationary tube. Referring to FIGS. 1 and 3, a first tube furnace 88 is preferably connected in sealed fluid communication with the stationary tube so that the first tube furnace is thereby connected in sealed fluid communication with the hollow inner chamber of the take-up reel. The first tube furnace also preferably includes a first tubular end 90 with a circular radially outer flange 91 overlapped by the circular radially outer flange at the second end of the stationary tube. A seal, such as one or more rubber or canvas flaps 92, is typically interposed between the circular radially outer flange on the first tubular end of the first tube furnace and the circular radially outer flange at the second end of the stationary tube, and can be is riveted or glued into place on the body of the stationary tube, for example, to act as a gas seal to help maintain a vacuum within the greenhouse gas collection apparatus for collecting the atmospheric mixture to be treated. The first tube furnace receives the atmospheric mixture collected by the greenhouse gas collection apparatus, and preferably contains a cupric oxide (CuO) bed 94, for example, to oxidize hydrocarbon vapors in the atmospheric mixture into carbon dioxide and water to yield a first tube furnace effluent 96 containing any unreacted portion of the atmospheric mixture and any carbon dioxide and water produced from the first tube furnace.

A second tube furnace 98 is connected in fluid communication with the first tube furnace, and receives the first tube furnace effluent. The second tube furnace preferably contains a catalyst 100, such as a chromium trioxide ($CrO_3$) bed, for example, to oxidize carbon monoxide to carbon dioxide, and to oxidize nitrous and nitric oxides from the atmospheric mixture to nitrogen dioxide, to yield a second tube furnace effluent 102 containing any further unreacted portion of the atmospheric mixture, any of the carbon dioxide, and any of the nitrogen dioxide from the second tube furnace.

A third tube furnace 103 containing an iron oxide catalyst receives the second tube furnace effluent, and oxidizes sulfur dioxide in the atmospheric mixture to sulfur trioxide to yield a third tube furnace effluent 104 containing any unreacted portion of the atmospheric mixture, any of the carbon dioxide, any of the nitrogen dioxide, and any of the sulfur trioxide from the third tube furnace.

Figure 7:
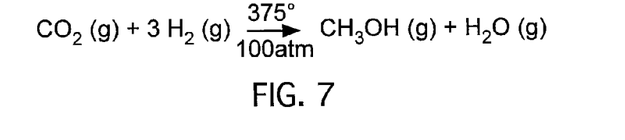
FIG. 7 is a chemical equation illustrating the hydrogenation of carbon dioxide to yield methane gas and water.
Figure 8:
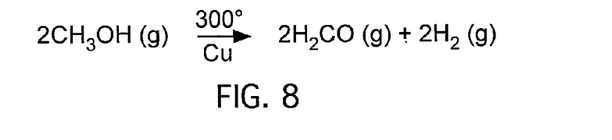
FIG. 8 is a chemical equation illustrating the dehydrogenation of methanol to form formaldehyde.

A scrubber 105 is connected in sealed fluid communication with an outlet 106 of the second tube furnace, and receives the third tube furnace effluent. A first end 108 of the scrubber is preferably fitted in sealed communication with the outlet of the third tube furnace, and an outlet pipe 110 at a second end 112 of the scrubber is fitted in sealed fluid communication with a vacuum line 114. The scrubber preferably contains a reactant 116 such as slaked lime, typically a solution of calcium hydroxide ($Ca(OH)_2$) in water, to precipitate out the carbon dioxide from the third tube furnace effluent as calcium carbonate as is illustrated in FIG. 15, yielding a scrubber effluent 118 containing a mixture of calcium hydroxide and precipitated calcium carbonate in water, any unreacted portion of the atmospheric mixture, any of the nitrogen dioxide, and any of the sulfur trioxide from the second tube furnace effluent, along with particulates and pollutants collected in the atmospheric mixture. The slaked lime reactant in the scrubber is typically prepared in the ratio of approximately 100 liters or gallons of water to about 100 pounds of calcium hydroxide ($Ca(OH)_2$), and as is illustrated in FIG. 7, the chemical reaction, precipitates out the carbon dioxide as calcium carbonate ($CaCO_3$). As will be further explained hereinbelow, the scrubber is configured to be removable from the second tube furnace, and is replaceable, so that once a sufficient amount of calcium carbonate is formed in the scrubber, the scrubber can be removed by truck to a chemical processing plant for treatment of the scrubber effluent, and a freshly charged scrubber can be installed.

The vacuum line from the scrubber outlet pipe is connected in sealed fluid communication to a vacuum pump 120, such as a Dyson vacuum-turbine type pump, for example to draw the atmospheric mixture collected from the atmosphere into the greenhouse gas collection apparatus and through the first tube furnace, to draw the first tube furnace effluent through the second tube furnace, to draw the second tube furnace effluent through the third tube furnace, to draw the third tube furnace effluent through the scrubber, and to draw any remaining particulates from the scrubber effluent through the vacuum pump. The vacuum pump or vacuum line preferably contains a trap for particulates, such as a filter bed (not shown) to trap and collect particulates, although it may also be suitable to pass exhaust gases from the vacuum pump through an electrostatic precipitator (not shown), such as a Cottrell electrostatic precipitator, for example, to collect the particulates.

Figure 4:
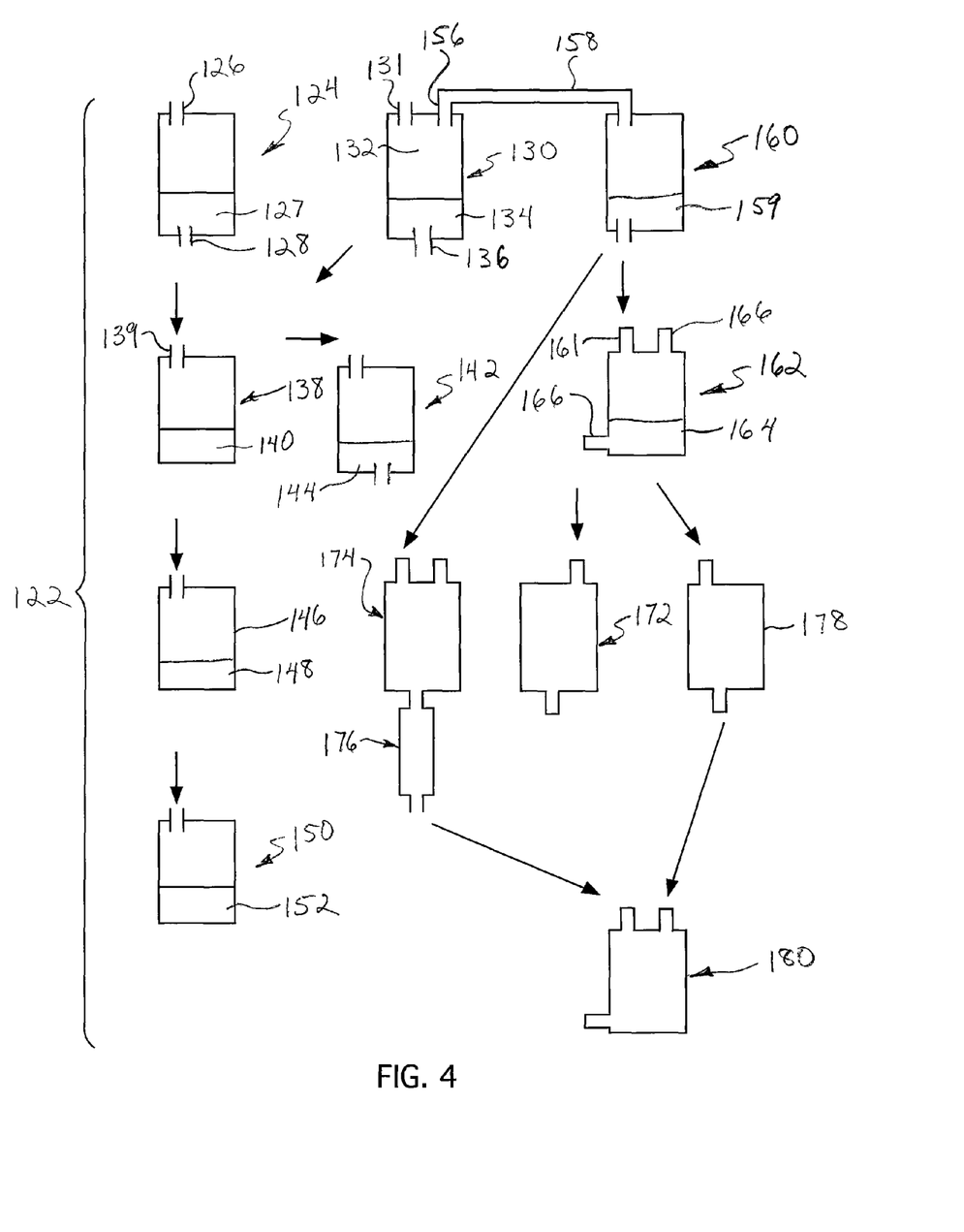
FIG. 4 is a schematic diagram illustrating a chemical processing plant for treating a scrubber effluent from the system and method of FIGS. 1A, 1B and 1C.

Referring to FIG. 4, a chemical processing plant 122 can also be provided to process the scrubber effluent mixture. The chemical processing plant can include a first filtering tower 124 having an inlet 126 for receiving the scrubber effluent mixture. The first filtering tower is configured to dry the scrubber effluent mixture to yield a filtration product 127 including calcium hydroxide and calcium carbonate and water, as well as any unreacted portion of the atmospheric mixture, any of the nitrogen dioxide, and any of the sulfur trioxide from the second tube furnace effluent, along with any remaining particulates and pollutants collected in the atmospheric mixture, which exits the first filtering tower through an outlet 128 of the first filtering tower. The chemical processing plant can also include an acidification reaction vessel 130 having an inlet 131, configured to acidify a portion of the filtration product from the first filtering tower by the addition of an acid, such as aqueous hydrochloric or aqueous sulfuric acid, for example, to the filtration product from the first filtering tower to yield carbon dioxide 132 and a residual solution 134 which exits through a lower outlet 136, and which can be added to the remaining portion of the filtration product from the first filtering tower.

Sodium sulfate is added to the residual solution from the acidification reaction vessel along with the remaining portion of the filtration product from the first filtering tower in a reaction vessel 138 through inlet 139, to yield a precipitate 140 of calcium sulfate dihydrate. This precipitate is filtered in a second filtration tower 142 to yield a calcium sulfate dihydrate filtrate 144. Sodium hydroxide is added to the calcium sulfate dihydrate filtrate in a reaction vessel 146 to precipitate out calcium hydroxide 148, which can be filtered through a third filtration tower 150 to yield a calcium hydroxide filtrate 152. Potassium chloride can be added to the calcium hydroxide filtrate in a reaction vessel (not shown), in which the resulting solution can be evaporated and cooled in a salt bath to precipitate potassium nitrate. The potassium nitrate can be filtered, washed with ethanol, and dried to concentrate the solution. If desired, fractional crystallization techniques can then be employed to separate sodium chloride from potassium chloride, which can then be recycled. The calcium hydroxide filtrate can be recovered and mixed with water, with additional calcium hydroxide to make up the solution of calcium hydroxide in water for a fresh scrubber.

Figure 5:
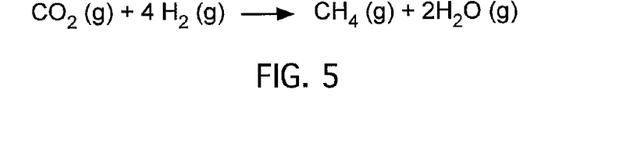
FIG. 5 is a chemical equation illustrating the reaction of hydrogen gas with carbon dioxide to yield methane and water in the chemical processing plant of FIG. 4.
Figure 6:
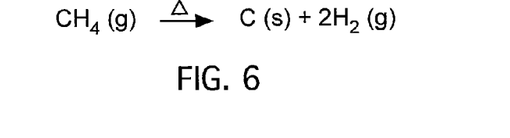
FIG. 6 is a chemical equation illustrating the dehydrogenation of methane to yield elemental carbon and hydrogen gas.
Figure 9:
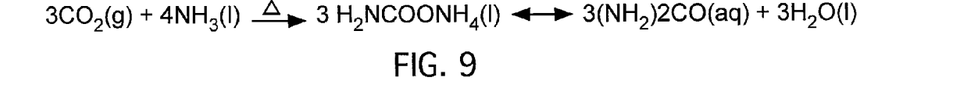
FIG. 9 is a chemical equation illustrating the reaction of carbon dioxide with ammonia to yield urea.
Figure 10:
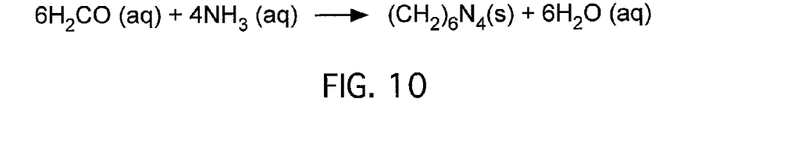
FIG. 10 is a chemical equation illustrating the reaction of formaldehyde with ammonia to form hexamethylenetetramine.
Figure 11:
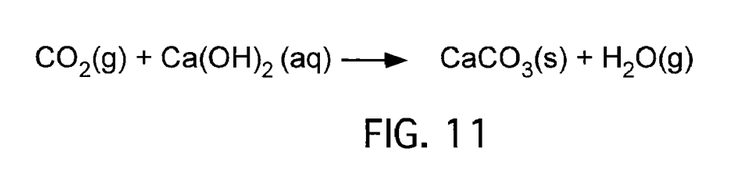
FIG. 11 is a chemical equation illustrating the reaction of calcium hydroxide and carbon dioxide to yield calcium carbonate and water.

Following the reaction in the acidification reaction vessel, wet carbon dioxide gas passes out through the outlet pipe 156 through a suitable conduit, such as a vacuum hose or piece of tubing 158, to a drying tower 160 preferably filled with an anhydrous desiccant 159, such as $Mg(ClO_4)_2$ or another similar suitable anhydrous desiccant. Referring to FIG. 4, in a first presently preferred embodiment of the chemical processing plant, dry carbon dioxide passes from the drying tower 160 through inlet 161 into a high pressure reaction vessel 162, which in one presently preferred variation can contain a solid phase catalyst 164, such as nickel. A second inlet 166 introduces dry hydrogen gas into the high pressure reaction vessel in the proper stoichiometric ratio to form methane, in the chemical reaction illustrated in FIG. 5. In order to form methane, the high pressure reaction vessel is heated to 300° Celsius. When the reaction forming methane is complete, the methane and water vapor mixture produced in the high pressure reaction vessel are vented from the high pressure reaction vessel through an outlet valve 166, and cooled, after which water is removed from the methane gas to yield dry methane gas. The dry methane gas is then conducted to a catalytic cracker apparatus 172, where under elevated temperatures the methane gas can be decomposed into carbon and hydrogen, and the hydrogen can be recycled to the high pressure reaction vessel. Alternatively, by means of another reaction, starting with dry carbon dioxide gas from the drying tower, dry carbon dioxide passes into a reaction vessel 174, where gaseous ammonia can be admixed with the carbon dioxide, and passed through a red hot tube furnace 176 to produce urea and water according to the reaction illustrated in FIG. 9. The effluent gas stream passes into a cold-finger or Friedrich's type condenser, where the resultant urea can be collected.

In another presently preferred variation, the high pressure reaction vessel can contain zinc chromate ($ZnCrO_4$), for producing methanol and water, in the chemical reaction illustrated in FIG. 7. Typically three equivalents of hydrogen to one equivalent of carbon dioxide can be introduced into the high pressure reaction vessel and heated to approximately 300° to 375° Celsius to produce methanol along with water vapor. The effluent gases can be passed through a standard Liebig type water-jacketed condenser to produce a condensed liquid mixture, which can then be distilled by fractional distillation to produce a clean separation of water and methanol. Alternatively, the methanol can further be passed in the vapor phase through a tube furnace 178 with a copper catalyst for dehydrogenation to produce gaseous formaldehyde. Any remaining methanol which has not reacted can be passed to a condenser to condense out the methanol, and a calcium chloride drying tower. This formaldehyde can be admixed in vessel 180 with ammonia or urea in water or alcohol solution to produce hexamethylenetetramine.

Alternatively, if desired, the calcium carbonate and calcium hydroxide mixture from the first filtering tower can be heated to produce water vapor and carbon dioxide. The byproduct, dry quicklime or calcium oxide, can then be mixed with water to form slaked lime which is then inserted with more water into a freshly cleaned scrubber shell, and transported by truck back to some site as needed. If this is done properly, with recycling of the slaked lime, then from the sale of carbon alone, the process produces per ton of carbon dioxide removed from the atmosphere, $30,000 gross in proceeds and in this manner the whole process is made feasible.

For a plant with a capacity of ten tons of carbon dioxide removed per day, i.e. per twenty four hour period, assuming labor costs of $15,000 per day, the first process would generate $270,000 in revenue for the sale of carbon, i.e. about two and three-quarter tons of carbon. For the sale of hexamethylenetetramine, the gross profit for the same type of plant as above is $286,380. The profit potential is greatest if methanol is produced and then reacted with ammonia or urea. With complete recycling, the process more than pays for itself.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A system for removing greenhouse gases, particulates and pollutants from the atmosphere, comprising:

a greenhouse gas collection apparatus including a collector assembly for collecting an atmospheric mixture from the atmosphere, said atmospheric mixture containing air pollutants selected from the group consisting of greenhouse gases, particulates, pollutants and mixtures thereof;

a first tube furnace connected in sealed fluid communication to said greenhouse gas collection apparatus and configured to receive said atmospheric mixture collected by the greenhouse gas collection apparatus, said first tube furnace being configured to oxidize hydrocarbons into carbon monoxide and water to yield a first tube furnace effluent containing any unreacted portion of said atmospheric mixture and any carbon monoxide and water from said first tube furnace;

a second tube furnace connected in sealed fluid communication with said first tube furnace to receive said first tube furnace effluent, said second tube furnace configured to oxidize hydrocarbons and carbon monoxide to carbon dioxide, to oxidize nitrous and nitric oxides to nitrogen dioxide, and to oxidize sulfur dioxide to sulfur trioxide, to yield a second tube furnace effluent containing any unreacted portion of said atmospheric mixture, any of said carbon dioxide, any of said nitrogen dioxide, and any of said sulfur trioxide from said second tube furnace;

a third tube furnace connected in sealed fluid communication with said second tube furnace to receive said second tube furnace effluent, said third tube furnace being configured to oxidize sulfur dioxide to sulfur trioxide to yield a third tube furnace effluent containing any unreacted portion of said atmospheric mixture, any of said carbon dioxide, any of said nitrogen dioxide, and any of said sulfur trioxide from the third tube furnace;

a scrubber connected in sealed fluid communication with said third tube furnace to receive said third tube furnace effluent, said scrubber being configured to precipitate out carbon dioxide as calcium carbonate, to yield a scrubber effluent containing calcium carbonate, any unreacted portion of said atmospheric mixture, any of said nitrogen dioxide, and any of said sulfur trioxide from said third tube furnace effluent; and a vacuum pump connected in sealed fluid communication to said scrubber for drawing the atmospheric mixture collected from the atmosphere into said greenhouse gas collection apparatus and through said first tube furnace, drawing said first tube furnace effluent through said second tube furnace, for drawing said second tube furnace effluent through said third tube furnace, to draw said third tube furnace effluent through said scrubber, and for drawing any remaining particulates from said scrubber effluent through said vacuum pump.

2. The system of claim 1, wherein said collector assembly comprises an air intake head positioned for collecting said atmospheric mixture, said air intake head including an interior chamber and a central outlet nozzle connected in sealed fluid communication with said interior chamber of said air intake head.

3. The system of claim 2, further comprising means for suspending the air intake head at a desired elevation in the atmosphere.

4. The system of claim 3, further comprising at least one hook on the surface of the air intake head, and at least one tether line having a first end connected to said at least one hook on the surface of the air intake head and a second end connected to an anchor.

5. The system of claim 1, wherein said scrubber contains a solution of calcium hydroxide in water, and said scrubber effluent contains a mixture of calcium hydroxide and precipitated calcium carbonate in water, along with particulates and pollutants collected in said atmospheric mixture.

6. The system of claim 5, further comprising a chemical processing plant configured to process said mixture from the scrubber, said chemical processing plant comprising a filtering tower configured to dry the mixture of calcium hydroxide, calcium carbonate and water to yield a precipitate of calcium hydroxide and calcium carbonate.

7. The system of claim 5, further comprising a high pressure reaction vessel configured to receive and heat the mixture of calcium hydroxide, calcium carbonate and water to yield a gaseous mixture of water vapor and carbon dioxide, and a precipitate of calcium oxide.

8. The system of claim 7, wherein said high pressure reaction vessel is also configured to react hydrogen gas with said carbon dioxide in said high pressure reaction vessel to yield methane and water.

9. The system of claim 7, wherein said high pressure reaction vessel is also configured to react hydrogen gas with said carbon dioxide in said high pressure reaction vessel to yield methanol.

10. A method for removing greenhouse gases, particulates and pollutants from the atmosphere, comprising:
    collecting an atmospheric mixture from the atmosphere, said atmospheric mixture containing air pollutants selected from the group consisting of greenhouse gases, particulates, pollutants and mixtures thereof;
    passing said atmospheric mixture through a first tube furnace to oxidize any hydrocarbons present in said atmospheric mixture into carbon dioxide and water to yield a first tube furnace effluent containing any unreacted portion of said atmospheric mixture and any carbon dioxide and water from said first tube furnace;
    passing said first tube furnace effluent through a second tube furnace to oxidize any hydrocarbons and carbon monoxide in said first tube furnace effluent to carbon dioxide, to oxidize any nitrous and nitric oxides in said first tube furnace effluent to nitrogen dioxide, to yield a second tube furnace effluent containing any unreacted portion of said atmospheric mixture, any of said carbon dioxide, and any of said nitrogen dioxide from said second tube furnace; and
    passing said second tube furnace effluent through a third tube furnace to oxidize sulfur dioxide to sulfur trioxide to yield a third tube furnace effluent containing any unreacted portion of said atmospheric mixture, any of said carbon dioxide, any of said nitrogen dioxide, and any of said sulfur trioxide from the third tube furnace;
    passing said third tube furnace effluent through a scrubber to precipitate out any carbon dioxide in said third tube furnace effluent as calcium carbonate, to yield a scrubber effluent containing calcium carbonate, any unreacted portion of said atmospheric mixture, any of said nitrogen dioxide, and any of said sulfur trioxide from said third tube furnace effluent.

11. The method of claim 10, wherein said step of passing said second tube furnace effluent through a scrubber comprises providing a solution of calcium hydroxide in water in said scrubber, and wherein said scrubber effluent contains a mixture of calcium hydroxide and precipitated calcium carbonate in water, along with particulates and pollutants collected in said atmospheric mixture.

12. The method of claim 11, further comprising the step of providing a chemical processing plant configured to process said scrubber effluent, comprising the steps of:
    drying said scrubber effluent to yield a precipitate containing calcium hydroxide and calcium carbonate; and
    acidifying a first portion of said precipitate containing calcium hydroxide and calcium carbonate to yield carbon dioxide and a residual filtrate.

13. The system of claim 11, further comprising the step of heating said scrubber effluent to yield a gaseous mixture of water vapor and carbon dioxide, and a precipitate of calcium hydroxide.

14. The method of claim 12, further comprising the step of mixing sodium sulfate with a second portion of said precipitate of calcium hydroxide and calcium carbonate to yield calcium sulfate dihydrate.

15. The method of claim 13, further comprising reacting hydrogen gas with said carbon dioxide to yield methane and water.

16. The method of claim 15, wherein said step of reacting hydrogen gas with said carbon dioxide comprises reacting hydrogen gas with said carbon dioxide in the presence of a nickel catalyst.

17. The method of claim 13, further comprising the step of reacting hydrogen gas with said carbon dioxide to yield methanol.

18. The method of claim 13, wherein said step of reacting hydrogen gas with said carbon dioxide comprises reacting hydrogen gas with said carbon dioxide in the presence of a $ZnCrO_4$ catalyst.

* * * * *